United States Patent

Mullett et al.

[11] 4,037,791
[45] July 26, 1977

[54] FLOW-CONTROL DEVICE

[76] Inventors: Leslie Fred Mullett, 29 Grantley Avenue, Victor Harbour, Australia, 5211; Alan James Brock, 26 Strangeways Terrace, North Adelaide, Australia, 5006

[21] Appl. No.: 623,229
[22] Filed: Oct. 17, 1975
[51] Int. Cl.² .............................................. B05B 1/30
[52] U.S. Cl. .................................... 239/542; 239/547; 138/45
[58] Field of Search ............... 239/533, 542, 547, 550; 138/45, 114, 43; 285/285

[56] References Cited
U.S. PATENT DOCUMENTS

| | | | |
|---|---|---|---|
| 2,449,731 | 9/1948 | Therrien | 285/285 |
| 2,764,183 | 9/1956 | Gollehon | 138/45 |
| 3,767,124 | 10/1973 | Spencer | 239/542 |
| 3,779,468 | 12/1973 | Spencer | 239/542 |
| 3,799,441 | 3/1974 | Delmer | 239/542 X |
| 3,815,636 | 6/1974 | Menzel | 138/43 |
| 3,899,136 | 8/1975 | Harmony | 239/542 X |

FOREIGN PATENT DOCUMENTS 2,267,698  11/1975  France .................................. 239/542

Primary Examiner—Evon C. Blunk
Assistant Examiner—Andres Kashnikow
Attorney, Agent, or Firm—Jay L. Chaskin

[57] ABSTRACT

A pressure compensated emitter device for controlling rate of water discharge in a drip irrigation emitter tube, wherein the tube is of resilient material and is partly contained within a plenum, wherein an increase pressure results in a reduction of tube diameter. The tube may contain a core of copper or other metal which will inhibit root growth in the vicinity of the discharge orifice.

13 Claims, 8 Drawing Figures

– 4,037,791 –

FLOW-CONTROL DEVICE

This invention relates to an irrigation system of the so called "trickle" type, and is directed to a pressure compensated emitter device.

BACKGROUND OF THE INVENTION

An essential feature of an irrigation system of the trickle type is the use of a metering orifice capable of limiting flow rates to very small flow rates, for example of the order of two or three litres per hour from a supply pressure of about 100 k Pa.

One of the most successful metering devices presently used comprises a length of fine bore tubing exposed to atmosphere at one end and to the irrigation supply water at the other end, the fine bore tubing however being susceptible to blocking by water borne debris and/or foreign matter entering from outside during shut down periods.

One of the objects of this invention is to provide improvements whereby danger of blocking is substantially reduced. A further object of the invention is to provide for flow rate compensation such that pressure increase does not produce a corresponding flow increase.

BRIEF SUMMARY OF THE INVENTION

In this invention a discharge tube for drip irrigation is formed with resilient walls, and is contained within a plenum. Increase of pressure within the plenum causes the walls of the tube to contract due to pressure differential within and outside the tube. This in turn results in a reduced flow aperture which compensates for the increased pressure an results in a flow the rate of which varies less than it otherwise would if the walls are comparatively rigid, making available a pressure compensating facility.

More specifically, in this invention a pressure compensated emitter device for controlling rate of liquid discharging from a plenum which contains liquid at super atmospheric pressure comprises a discharge tube of comparatively small diameter and large length contained within the plenum, the discharge tube having an inlet end within the plenum and discharge end downstream of the inlet end whereby a pressure gradient occurs between the ends of the discharge tube and a pressure differential exists between the plenum and the space within the discharge tube which increases towards the discharge end, the walls of the discharge tube being sufficiently resilient that the pressure differential reduces the cross-sectional area of at least portion of the discharge tube.

The term "small diameter and large length" means a tube having an internal diameter which is less than 1/20th of its length.

If the pressure differential reduces the cross-sectional area of portion of the tube, that portion becomes the smallest diameter portion and thereby becomes the portion most likely to block. However each time the pressure is removed the resilience of the tube allows it to regain its former dimension, and the contraction and expansion of the tube has the effect of releasing particles from adhesion to the inner walls of the tube, which would otherwise build up and block the tube.

Frequently irrigation systems are installed over undulating land, and since the pressure is relatively low there is a tendency for the high outlets to discharge at a lower rate than the low outlets. It will further be seen with this invention that variations in pressure cause corresponding variations in the inner tube diameter, so that some degree of compensation can be achieved whereby flow rate increase due to pressure increase is substantially reduced. In practice is has been found that a substantially constant rate of flow can be achieved with a pressure range of 10 to 1. This feature has great advantage in that it renders unnecessary separate tube lengths for different positions in an irrigation system.

As said, use of a resilient wall discharge tube within a plenum is effective in reducing flow increase as pressure increases. However, we have found (contrary to expectation) that insertion of a core within the resilient wall tube contributes further to reducing flow rate variation in response to the pressure variation. It is believed that the Bernoulli principle is involved, that is, that the total head present in the flowing liquid is constant throughout the length of the discharge tube, said head comprising potential, pressure and velocity heads, so that increase in velocity results in consequential decrease in pressure. The effective increase in velocity is greater with than without a core. Furthermore, if the core is copper, it resists root intrusion, and can be retained by flattened ends.

Thus further according to the invention a core extends through the discharge tube from one end to the other.

BRIEF DESCRIPTION OF THE DRAWINGS

The invention will be seen to take different forms and to achieve further advantages, embodiments of the invention are described hereunder in some further details with reference to and are illustrated in the accompanying drawings in which.

DETAILED DESCRIPTION OF THE DRAWINGS

Figure 1:
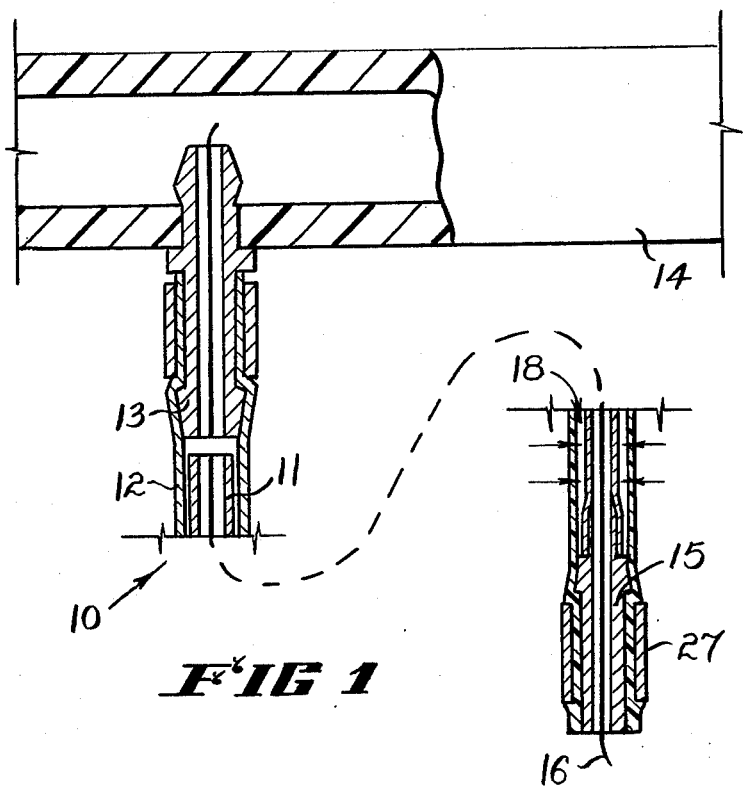
FIG. 1 is a fragmentary partly sectioned view illustrating a pressure compensated emitter which engages a wall of a distribution pipe.
Figure 2:
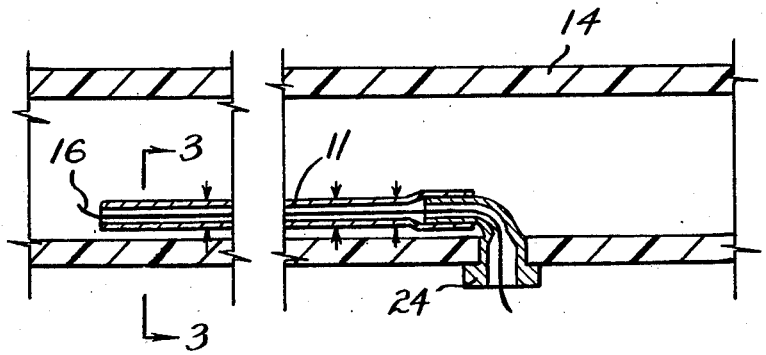
FIG. 2 illustrates a second embodiment wherein the discharge tube is contained within a distribution pipe which itself forms a plenum.

Referring first to the embodiment of FIGS. 1 and 2 a pressure compensated emitter device 10 for controlling the rate of liquid discharging from a plenum comprises a discharge tube 11 contained within a stiff walled outer tube 12 (formed for example from polyethylene) the outer tube 12 itself having an inlet nipple 13 engaging through the wall of a distribution pipe 14 and an outlet nipple 15 to which is secured the discharge end of the discharge tube 11 as well as the corresponding end of the outer tube 12, and as illustrated in the drawings. A length of copper wire 16 extends through the whole of the length of the discharge tube 11, the wire 16 being of smaller diameter than the inner diameter of the tube 11. In this embodiment the discharge tube 11 is formed from soft rubber of good quality and having a high degree of elasticity, and a hardness between 20 and 50 Shore A, and the outer tube 12 constitutes walls defining a plenum space which is designated 18, and since there is no flow through the plenum space (other than flow through the discharge tube) the pressure on the outer wall of the discharge tube 11 is constant throughout its length while the pressure within continuously reduces towards the discharge end. Accordingly the pressure differential gradually increases between the plenum space 18 and the space within the discharge tube 11, so that the discharge tube 11 is caused to radially contract as illustrated in FIG. 1 and thereby reduce the flow.

The higher the pressure, the more the water passage is reduced and this provides the pressure compensating feature of the invention. Furthermore, the core 16 is composed of copper, and this has the function of inhibiting root growth within the tube 11 or nipple 15.

Figure 3:
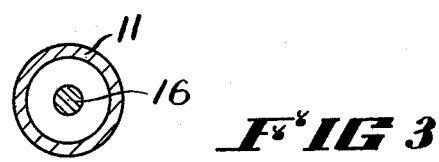
FIG. 3 is a section on line 3—3 of FIG. 2 but drawn to an enlarged scale, and illustrating the core contained within the discharge tube.

In FIG. 2 the distribution pipe 14 is provided with an aperture through which a tube fitting 24 passes, and the discharge tube (again designated 11) is contained wholly within the distribution pipe 14, the inner space of which adjacent the tube 11 constitutes the plenum. FIG. 3 is a section taken on line 3—3 of FIG. 2, and illustrates the manner in which the root inhibiting copper core 16 is contained within the discharge tube 11. One advantage of the arrangement of FIG. 2 is that the whole of the emitter device except for the tube fitting 24 is contained within the distribution pipe and therefore is not subject to damage which is likely to occur with the arrangement illustrated in FIG. 1.

Figure 4:
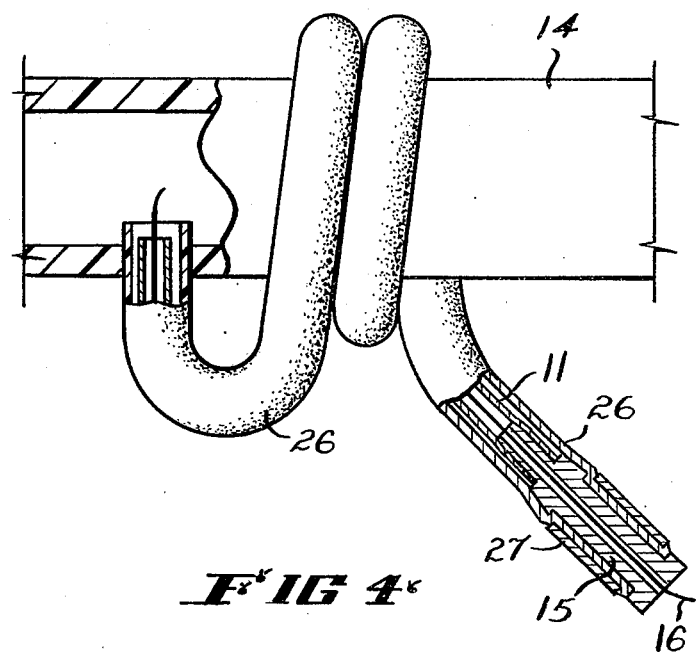
FIG. 4 illustrates a further embodiment wherein the discharge tube is contained within a plenum which is itself coiled around the distribution pipe.

In FIG. 4 similar elements are designated similarly the distribution pipe 14 having an aperture therein which receives one end of an outer resilient tube 26 and this is coiled around the distribution pipe 14. The inlet end of the tube 26 passes through the aperture within the pipe 14 with an interference fit so that little or no leakage occurs. As in FIG. 1 the outer ends of the tubes 11 and 26 are retained on an outlet nipple 15. In both instances, a keeper band designated 27 retains the tube 26 in place. Once again the discharge tube 11 is shown as containing a (copper) wire core 16 which extends between its ends. In a variation of this embodiment, tube 26 is of semi-rigid material (for example polypropylene), formed to a coil shape after insertion of the copper wire and rubber, and heated to a relatively low temperature to retain the shape. Still further, the discharge end of the rubber may be folded over the end of the tube 26 and retained with a short tube of plastics material, thereby avoiding the need for nipple 15.

Figure 5:
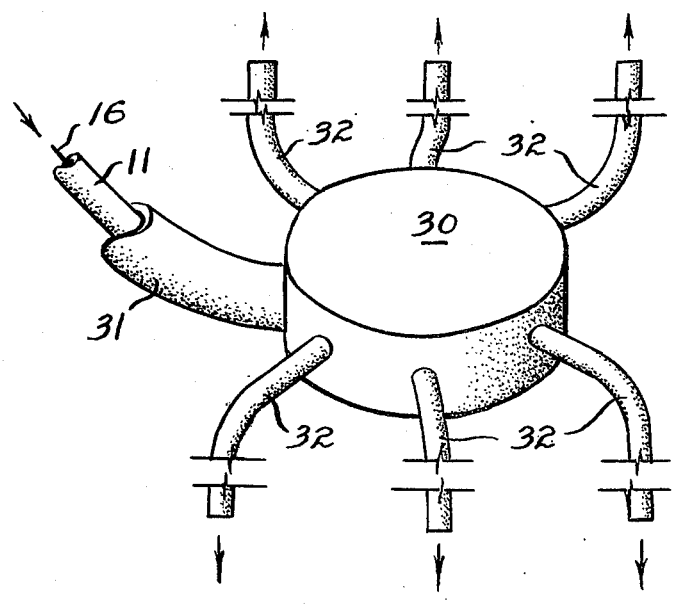
FIG. 5 is a perspective view of a multi-outlet distributing head.

Since the device is essentially a flow control device and not a pressure control device, it is applicable to use with a distribution head so that small rates of flow can be achieved. In FIG. 5 a distribution head 30 is fed by means of a discharge tube 11 again containing a copper wire core 16 and contained within a plenum pipe 31. Thus the distribution pipe 11 regulates the amount of irrigating water which flows into the distribution head 30 and this water is further distributed by means of the branch lines 32.

Figure 6:
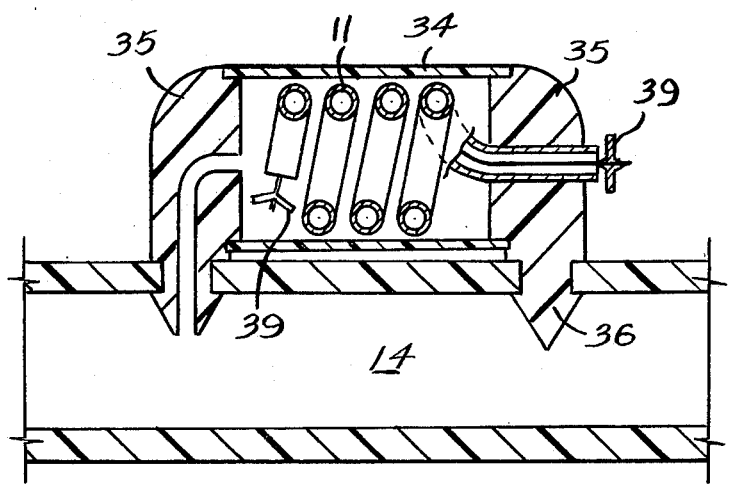
FIG. 6 is a section through portion of a distribution pipe showing a still further embodiment wherein the discharge tube is contained within a plenum secured to the side wall of the distribution pipe.
Figure 7:
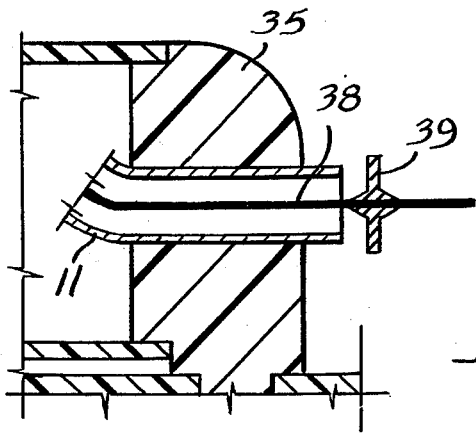
FIG. 7 is an enlarged sectional view of the discharge end of the discharge tube illustrated in FIG. 6 showing the arrangement of a copper member carried on a nylon core.

In FIG. 6 the invention is shown as a device which snaps into the distribution pipe 14. The device is provided with a short length of tube designated 34 extending between two end blocks 35 each of which is provided with a nipple 36 which enters and is retained in a respective aperture in the pipe 14. The space defined between the end blocks 35 and within the tube 34 becomes the plenum, and as illustrated in FIG. 7 the plenum contains a short length of rubber tube coiled within it which constitutes a discharge tube 11. The discharge tube 11 passes outwardly through one of the end blocks 35. The discharge tube 11 contains a core designated 38 which in this embodiment is a core of nylon, a core having secured to each end of it a washer-like member of copper designated 39. As illustrated in FIG. 7, the copper washer 39 is effective in inhibiting root growth into the tube 11. Alternatively the projecting end of tube 11 may have a coating of copper for this purpose.

Figure 8:
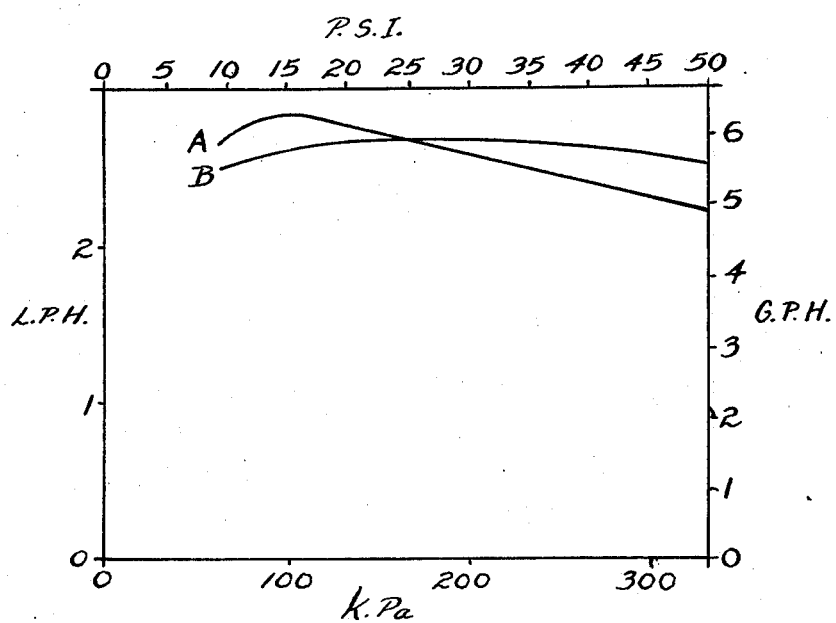
FIG. 8 is a graph of flow rate against pressure of FIGS. 1 and 4 respectively.

FIG. 8 is a graph showing actual results achieved in the respective embodiments of FIGS. 1 and 4. The graph dsignated A shows a "drooping" flow rate above about 100kPa, this being a normal characteristic of an uncoiled emitter device as shown in FIG. 1. In FIG. 4 however, the device is coiled, and this resulted in a flow rate which varied only about 10% between 100 and 300 kPa. This is illustrated as graph B.

A brief consideration of all the above embodiments will indicate that the invention is exceedingly simple. It achieves a compensating feature without the complexities which are inherent in devices such as those described and illustrated in the U.S. Pat. No. 3,779,468, which rely upon pressure to close irrigating valves before they can function as such. Use is made of standard products which are already produced in large quantities, and which are exceedingly inexpensive. The invention can be varied in many ways, and for example the emitter device may be clamped to the distribution pipe; the end of the discharge tube 11 may be folded (turned "inside out") over the end of the plenum tube in the configuration of FIG. 5; the discharge tube length 11 can be formed to be so small that it is convenient to contain it within the distribution pipe 14 if the irrigating point is required to be adjacent the pipe 14; and in many other ways the device is flexible and easy to use in different configurations. The device of FIG. 6 may be varied by having a flat helical discharge tube contained within a cylindrical member which itself has a depending hollow central nipple which is arranged to engage through an aperture in a distribution pipe and be supported thereby.

The above description has referred to the use of a copper core. The core may also be of other materials with root inhibiting qualities. For example, copper is likely to quickly corrode in the presence of hard water, and in such cases an alloy, for example Naval bronze or other copperrich wire, may be utilised. Another alternative which is effective is a marine grade aluminum wire. Such a wire will exhibit root growth inhibition qualities, without the rapid disintegration associated with other grades of aluminum.

What we claim is:

1. A pressure compensated emitter device for controlling rate of liquid discharging from a plenum which contains liquid at superatomspheric pressure, comprising a discharge tube of comparatively smaller diameter and large length contained within said plenum, the discharge tube having an inlet end within the plenum and a discharge end downstream of the inlet end whereby a pressure gradient occurs between said ends of the discharge tube and a pressure differential exists between the plenum and the space within the discharge tube which increases towards said discharge end, the walls of said discharge tube being sufficiently resilient that the pressure differential reduces the cross-sectional area of at least a portion of said tube and;

a core extending through the tube from one said end to the other, the core having substantially a smooth surface and substantially a constant diameter throughout its length.

2. A pressure compensated emitter device according to claim 1 wherein the walls of the tube are resilient and have a hardness of between 20 and 50 Shore A.

3. A pressure compensated emitter device according to claim 1 wherein the core is copper-rich wire.

4. A pressure compensated emitter device according to claim 1 wherein said plenum which contains said tube is formed by a sheath which defines the plenum space and in which there is no flow of liquid other than said discharging liquid.

5. A pressure compensated emitter device according to claim 4 further comprising a distribution pipe, an aperture in the pipe wall, an inlet nipple extending into and sealably engaged by the walls defining the aperture, one end of said sheath sealably engaging the inlet nipple, and a discharge nipple, the other end of said sheath and said discharge end of said discharge tube both sealably engaging said discharge nipple.

6. A pressure compensated emitter device according to claim 4 further comprising a discharge nipple, and a keeper band retaining said sheath to said discharge nipple.

7. A pressure compensated emitter device according to claim 4 further comprising a distribution pipe, an aperture in the pipe wall, one end of said sheath extending into and being sealably engaged by the walls defining the aperture the inner surface of the other end of said sheath and the outer surface of said discharge end of said discharge tube having cement joining them.

8. A pressure compensated emitter device according to claim 1 wherein a water distribution pipe comprises said plenum.

9. A pressure compensated emitter device according to claim 8 wherein said distribution pipe has an aperture in its wall, and further comprising a tube fitting extending through and sealably engaged by the walls defining said aperture, said tube being contained within the pipe and retained on the fitting tail by resilient deformation.

10. A presure compensated emitter device according to claim 1 wherein said core is non-metallic and terminates at each end in a growth inhibiting member which is adjacent to and exterior of a respective end of said discharge tube.

11. A pressure compensated emitter device according to claim 10 wherein the member is a copperrich metal.

12. A pressure compensated emitter device according to claim 1 wherein the core is of a metal which is growth inhibiting.

13. A device for discharging liquid, comprising a distribution head, an inlet conduit extending into the head, a plurality of outlet conduits extending outwardly from the head and each being of smaller cross-sectional area than said inlet conduit, said inlet conduit being a discharge tube contained within a plenum of a pressure compensated emitter device for controlling the rate of liquid discharging therefrom, the discharge tube having an inlet end within the plenum and a discharge end downstream of the inlet end whereby a pressure gradient occurs between said ends of the discharge tube and a pressure differential exists between the plenum and the space within the discharge tube which increases towards the discharge end, the walls of the discharge tube being sufficiently resilient that the pressure differential reduces the cross-sectional area of at least a portion of said tube and a core extending through the discharge tube from one said end to the other, the core having substantially a smooth surface and substantially a constant diameter throughout its length.

* * * * *